Figure 1:
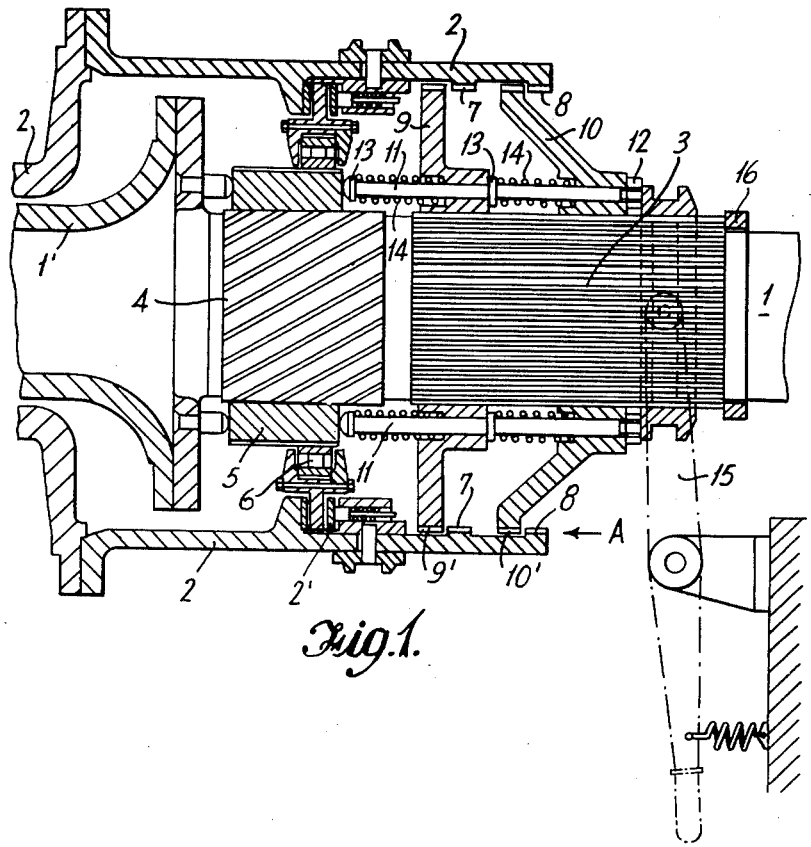

May 16, 1961 W. H. DARLINGTON ET AL 2,984,324
CLUTCHES
Filed April 30, 1958 5 Sheets-Sheet 1

INVENTORS
WILLIAM H. DARLINGTON
JAMES F. SHANNON
JAMES FULTON
JOHN M. DODDS
Norrin Bateman
ATTORNEYS May 16, 1961 W. H. DARLINGTON ET AL 2,984,324
CLUTCHES
Filed April 30, 1958 5 Sheets-Sheet 3

INVENTORS
William H. Darlington
James F. Shannon
James Fulton
John M. Dodds
Norris + Bateman
ATTORNEYS May 16, 1961 W. H. DARLINGTON ET AL 2,984,324
CLUTCHES
Filed April 30, 1958 5 Sheets-Sheet 5

INVENTORS
William H. Darlington
James F. Shannon
James Fulton
John M. Dodds
Norris & Bateman ATTORNEYS United States Patent Office 2,984,324
Patented May 16, 1961

2,984,324

CLUTCHES

William Henry Darlington, Stretford, James Forrest Shannon, Bowdon, James Fulton, Stretford, and John Mathieson Dodds, Timperley, England, assignors to Metropolitan-Vickers Electrical Company Limited, London, England, a British company Filed Apr. 30, 1958, Ser. No. 731,925

Claims priority, application Great Britain May 8, 1957

13 Claims. (Cl. 192—67)

This invention relates to clutches for transmitting power between two rotating members, for example machine shafts. The invention offers particular advantage when applied to self-synchronising clutches in turbine power plants for ship propulsion, but is not limited to such use.

Some known forms of synchronising clutches employ mechanisms which ensure that the entering clutch teeth are in precise alignment with the mating clutch teeth at synchronous speeds, and so are allowed to enter freely. At high speeds and large powers, however, and in cases where the clutches are only operated at long intervals, these aligning mechanisms are liable to damage.

Alternative arrangements involve free wheels or like mechanisms which are able to withstand free wheeling indefinitely. These may be electro-magnetic devices or the Borg-Warner Sprag type of free wheel clutch. All these, however, come into operation at synchronism at an arbitrary position of the engaging clutch members in contra-distinction to the precise engagement as obtained by the mechanism previously mentioned. These present no difficulty where the synchronising device can be used to take the full power and arrangements can be made to lock the device if desired. Such methods are suitable for low powers. However with large powers, free wheel or electro-magnetic devices become large and cumbersome if they have to transmit full power, and it is best to use these as synchronising devices to enable the load to be taken up by more robust clutch teeth.

The improved clutch according to this invention for connecting two co-axial rotatable elements includes two rings of clutch teeth fixedly mounted on one of the elements with the teeth on the two rings in angular alignment with each other, two toothed clutch members slidably mounted on the second element in such manner that they are capable of axial movement only both with respect to each other and to the second element for engagement with the fixed rings of teeth, the teeth on these two members being angularly displaced so that the teeth of one set are aligned with the spaces between the teeth of the other set, the width of the spaces between the teeth of each of the four sets being approximately three times the width of the teeth so that either of the slidable members may be moved independently into engagement with a fixed ring of teeth, means including a plurality of spring-loaded rods passing axially through the slidable members for transmitting a force to at least one of the members urging the teeth into engagement with the fixed teeth, means biasing the members normally apart, and means for disengaging the movable teeth from the fixed teeth.

The two sets of fixed teeth may be of the same radius cut on the inner periphery of a ring or drum secured to the one element; in this case the two sets will be axially displaced with respect to each other. In an alternative construction the two sets of teeth may be in the same axial plane, the one set being on the inner surface and the other on the outer surface of the ring, the teeth of each set being radially aligned. The latter construction offers the advantage of a more compact unit with a saving of overall axial length.

Figure 2:
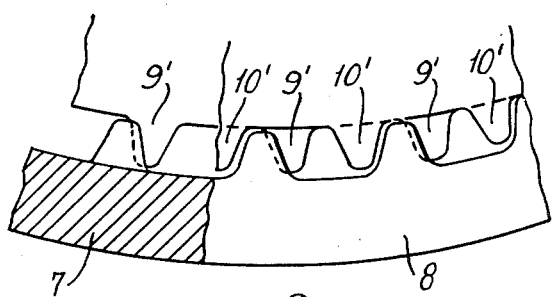
Figure 3:
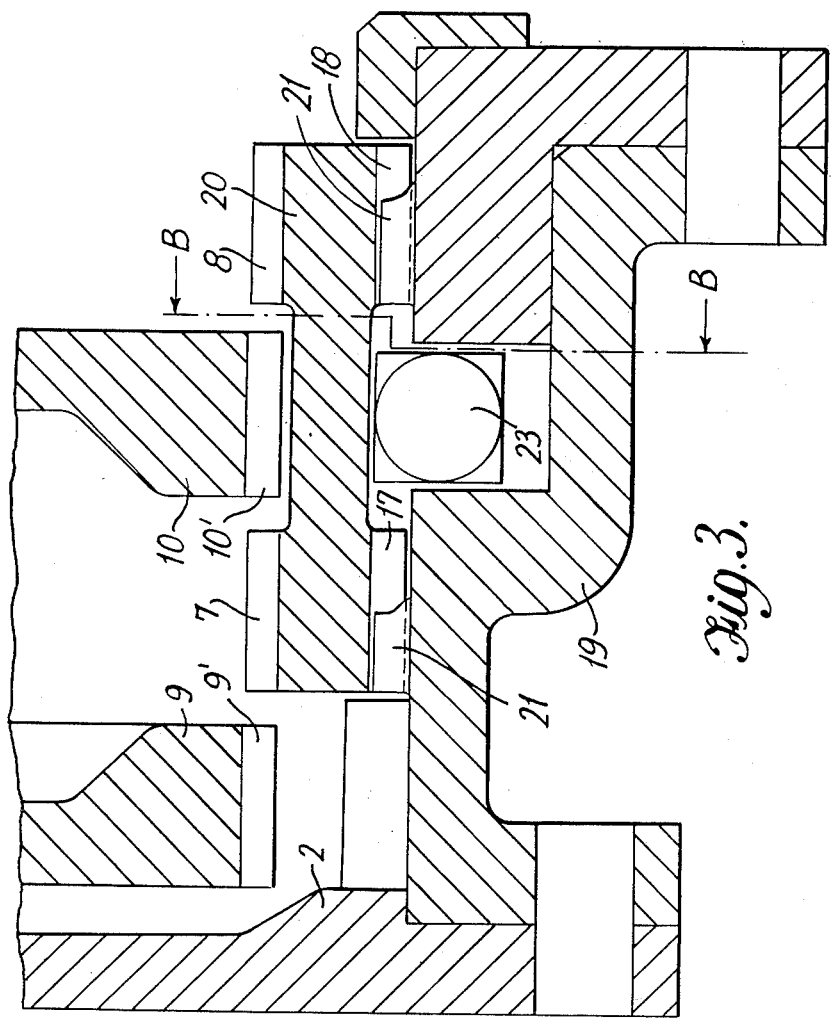
Figure 4:
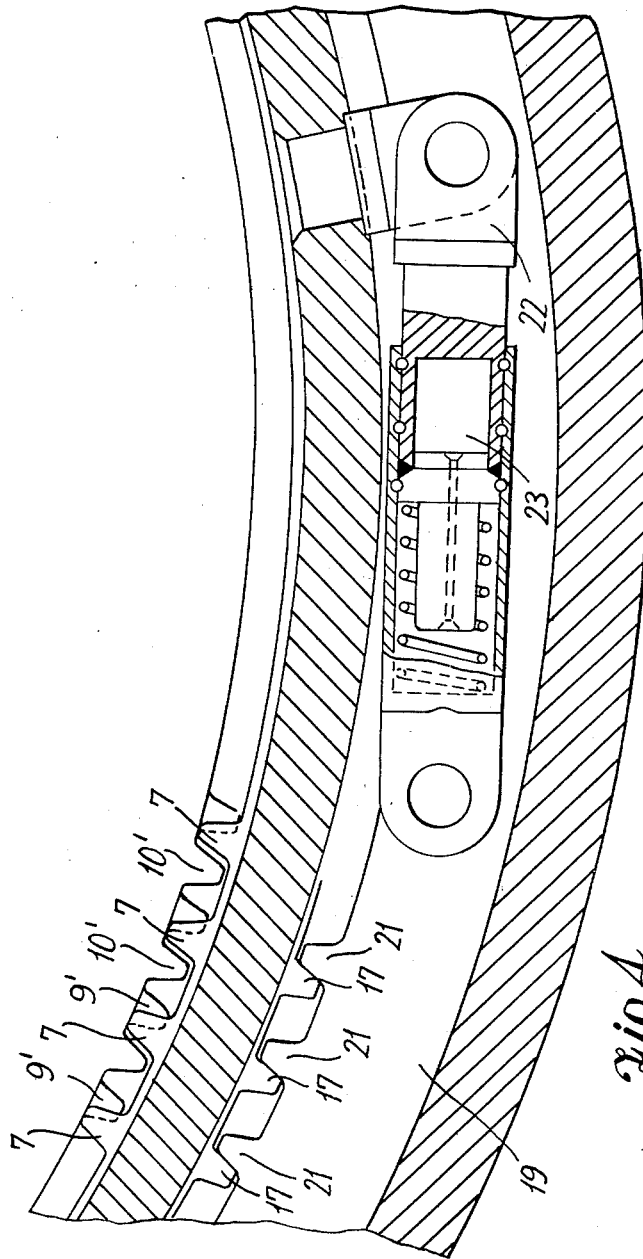
Figure 5:
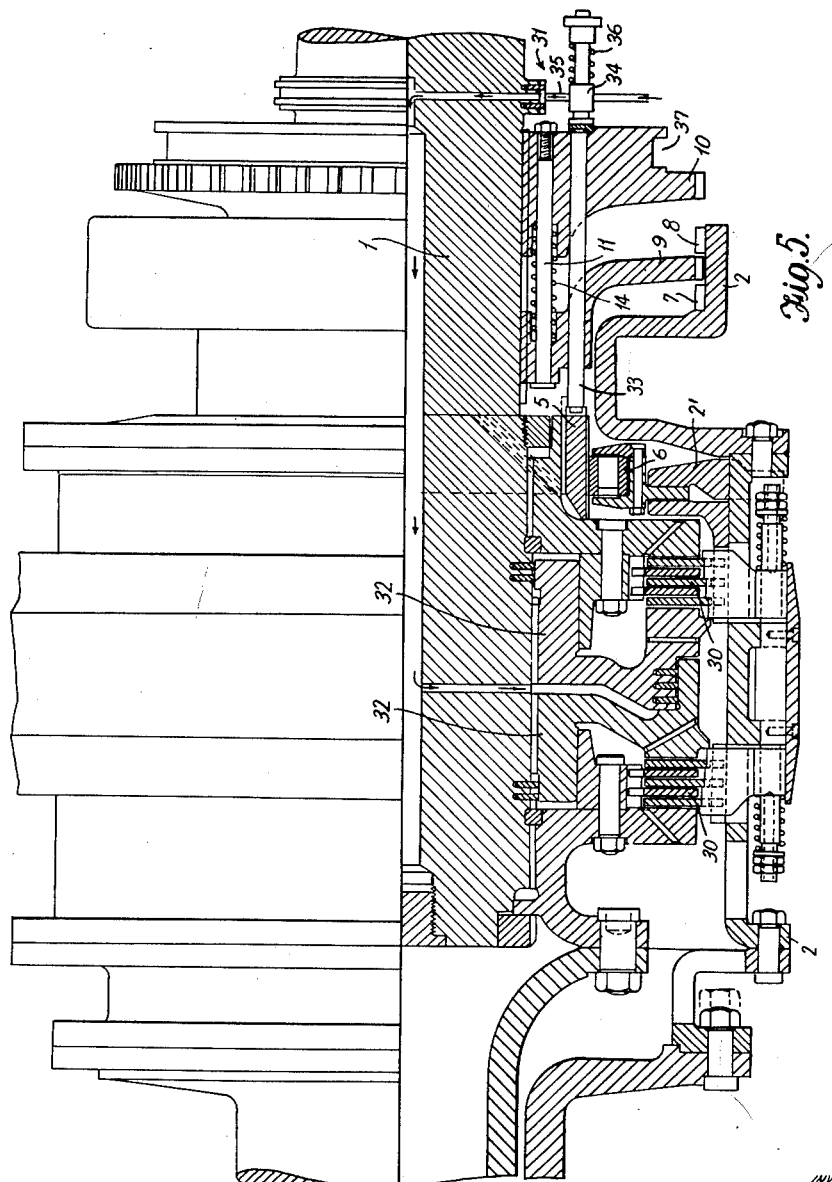
Figure 6:
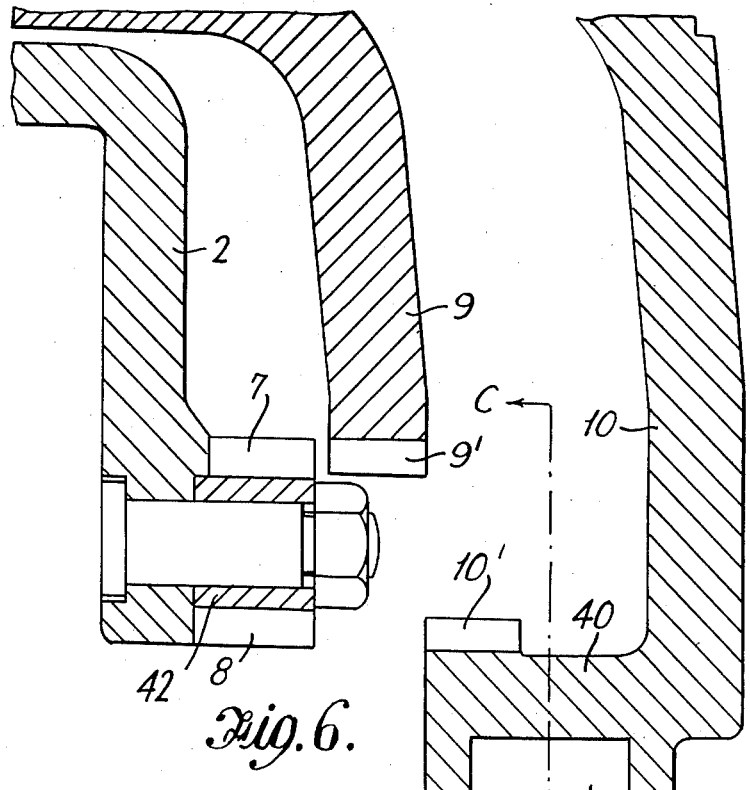
Figure 7:
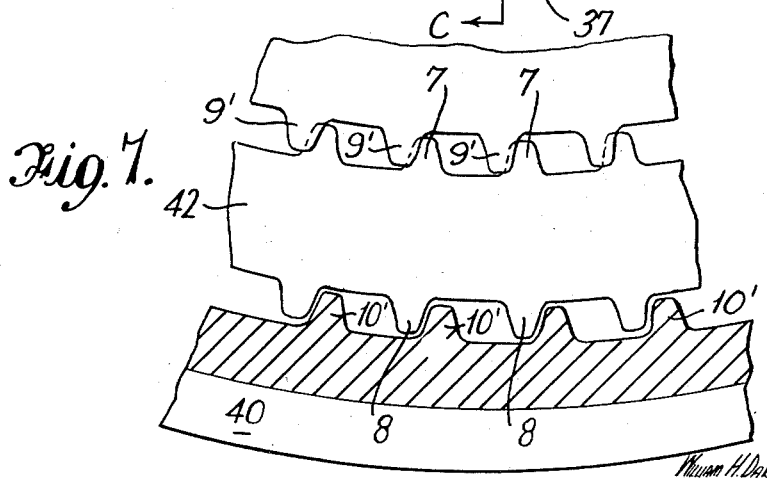

The invention may be more readily understood from a consideration of the following description of the drawings filed with this specification. In the drawings Fig. 1 is an axial section through an automatic synchronous clutch embodying the invention, and Fig. 2 is an enlarged detail along the arrow A in Fig. 1 showing the relative disposition of clutch teeth; Fig. 3 is a large scale fragmentary view of clutch teeth arranged as in Fig. 1 incorporating an additional feature, and Fig. 4 is an end view taken on the line B—B of Fig. 3; Fig. 5 is an axial section of a synchronous oil-operated friction clutch to which the invention is applied to provide a mechanical lock. Fig. 6 is a fragmentary large scale view showing the fixed and moving clutch teeth in an alternative arrangement to that of Figs. 1 or 5, and Fig. 7 is an end view on the line C—C of Fig. 6. In all figures like reference numerals denote corresponding parts.

Referring to Fig. 1, the two relatively rotatable elements to be connected are shown as a driving shaft 1 and a driven shaft 2. The shaft 2 is hollow to enable an extension 1' of the shaft 1 to extend through, and these parts are mounted so as to be rotatable about a common axis. The shaft 1 is provided with a straight splined portion 3 and helical splines 4. A threaded collar 5 mounted on splines 4 supports a free wheel device 6 whereof one element engages with the inside of shaft 2; the arrangement is such that the collar 5 moves along the splines 4 (to the right) when there is a positive differential speed between the elements 1, 2 above synchronism.

The end of shaft 2 provides a casing or housing for the free wheel mechanism and the clutch engaging members of a clutch mechanism according to this invention. These comprise two rings of teeth 7, 8 and two toothed clutch members 9, 10 slidably mounted on the splines 3. The number of teeth on the rings and sliding members are equal and all four have alternate teeth omitted, i.e. the width of the teeth is approximately one third the width of the spaces between teeth. The teeth 7, 8 are in alignment; the members 9, 10 are angularly displaced so that the teeth 9' lie between the teeth 10' when viewed axially. The arrangement will be understood from the large scale diagram in Fig. 2; the teeth 10' on member 10 are shown in the spaces between fixed teeth 8 whilst the teeth 9' overlap the profile of fixed teeth 7 at the left. It can be seen that if rings 7, 8 are displaced slightly clockwise, the teeth 9' as well as teeth 10' can be slid between teeth 7 and 8.

For moving the members 9, 10 (to the right) along splines 3, a number of push rods 11 are provided. These rods are threaded to receive nuts 12 at one end and extend through holes in members 9, 10. The other ends of the rods abut the side face of collar 5. The rods are formed with collars 13 between which and the side faces of members 9, 10 are positioned compression springs 14 to provide a spring loading which maintains members 9, 10 in axially spaced relation to the fixed teeth 7, 8. Manually operated lever 15 is provided to enable the clutch members to be disengaged. A shoulder 16 on shaft 1 limits movement to the right. Alternatively the lever 15 may be servo-operated.

When the free wheel over-rides and picks up at any arbitrary position, the collar 5 moves axially to the right against spring loaded rods 11; it will be seen that teeth on one of the members 9, 10 can always be pushed axially into the spaces between its associated teeth 7, 8 on the element 2. The other member will not engage unless by chance exact alignment of teeth 9', 10' with spaces between teeth 8 has been made. As the free wheel speed increases the slight differential speed moves the driving shaft 1 round until the teeth of the entered wheel members 9 or 10 engage with the teeth of the driven member 2. At this position the second driving member can be entered axially giving complete locking of the two elements 1, 2.

To unlock the shafts, the two driving members can be moved axially to the left by means of the lever 15.

This mechanism can be incorporated in a plant where one of the shafts can be reversed, for example, in a combined steam and gas turbine plant where the gas turbine is brought into operation for boost purposes. In such plants the steam turbine drive carrying the element 2 may have to be reversed independently. To permit this the synchronising mechanism must be isolated. In the example shown this is done by incorporating a small friction clutch 2' on the steam drive shaft 2 which drives the free wheel when in use and may be disengaged at will.

Figs. 3 and 4 illustrate a modified arrangement of the clutch teeth wherein, in order to ensure complete entry of the first set of teeth 9' or 10' before full torque is taken up, the driven member 2 incorporates an outer anchor ring 19 and the teeth 7, 8 are formed on the inside of an intermediate ring 20. The inner peripheral surface of ring 19 carries a number of teeth 21 which are widely spaced in similar fashion to the teeth 7, 8; the teeth 21 are in mesh with correspondingly spaced teeth 17, 18 on the outer surface of the ring 20. The spacing between teeth 21 may be three times the width of the teeth or more. The ring 20 is supported by a number of linkages 22 including spring dashpots 23, one being illustrated in Fig. 4, to give a controlled initial torsional stiffness. The pitch of the spaced teeth on ring 19 in conjunction with the helix angle of the splines 4 is such that complete entry of either member 9, 10 will take place from any relative position, before full torque is applied. When full torque is applied the drive is taken through the teeth. The strength of the dashpots is such as to damp out any vibration.

As the main clutch is mounted on straight splines 3 and the drive teeth 7, 8 are also straight there will be no bendix effect once the teeth are engaged. Also the effect of rapid acceleration on the operating collar 5 is catered for by the action of the dashpot springs which provide an increasing resistance to axial movement.

As an alternative to a direct drive tooth clutch with its direct locking, a friction clutch can be used as an intermediary. For large powers this is possible only by operating the friction clutch at or near synchronism because little or no heat dissipation occurs when the friction clutch operates. Such an arrangement is shown in Fig. 5 where a double multi-plate friction clutch 30 is shown. As before in Fig. 1, the free wheel 6 picks up at synchronism but in this instance drives an oil relay mechanism 31 which admits high pressure oil to the centre of the shaft 1 and thence to the two pistons 32 of the friction clutch, which comes into operation on separation of the pistons and takes up the drive.

The collar 5, on moving to the right, pushes rods 33 against a valve slide 34 to move it to the right, thereby opening an oil passage 35 to the shaft 1 to permit the flow of high pressure oil in the direction of the arrows. The slide 34 is normally biased to the left (i.e. to a closing position) against the ends of the rods 33 by springs 36.

As a final safeguard mechanical locking of the elements 1, 2 is obtained by the clutch engaging members 7-10 embodying the invention which are constructed and arranged in a similar manner to that previously described with reference to Figs. 1 and 2. Engagement between teeth 7, 8 and those on member 9 or 10 is effected by moving the members 9, 10 to the left by means of a control lever (not shown) operating through a circumferential channel 37 on member 10, the thrust being imparted to the member 9 through springs 14 on the rods 11 passing through holes in members 9, 10. Rods 11 are threaded to receive nuts at one end and have heads at their other ends, the nuts and heads forming abutments for sliding members 9 and 10. Springs 14 surround rods 11 and are in compression to bias members 9, 10 against these abutments on the rod ends. It will be seen that a thrust applied to the member 10 to the left in Figure 5 will move one or the other of the members into toothed engagement with teeth 7 or 8 in the same manner as in Figure 1 above described. To complete the locking, the friction clutch 30 can be allowed to slip sufficiently to permit the second driving member 9 or 10 to engage, after which the drive can be taken by either the friction clutch or driving members or both together. In this case there is no need to provide a dashpot anchor ring, because the friction clutch is already holding the two shafts 1, 2 at equal speeds and consequently no load is taken by the teeth on member 9 or 10 on entry.

An alternative arrangement of the clutch teeth is shown in Figs. 6 and 7 wherein the fixed teeth 7, 8 are formed on the inner and outer surfaces of a ring 42 secured to the driven shaft 2. The sliding member 10 is formed with a circular flange 40 which supports an internal set of teeth 10' in position to engage the teeth 8; the outside of this flange is formed as a circumferential channel 37 for receiving clutch operating lever mechanism (not shown). As in the former case, the teeth 7, 8 are in angular alignment lying on the same radii, and the teeth 9', 10' are angularly displaced, the teeth 9' being on radii intermediate the radii of teeth 10'. This arrangement is clearly shown in Fig. 7.

What we claim is:

1. A clutch mechanism for connecting two co-axial rotatable elements comprising in combination two co-axial rings of clutch teeth fixedly mounted on one of said elements, the teeth on said rings being in angular alignment with each other, said other rotatable element having a pair of toothed clutch members longitudinally slidably mounted thereon coaxial with said fixed rings, a ring of teeth on each of said members, said members being capable of axial movement only both with respect to each other and to said other element for engagement with said fixed rings of teeth, the teeth on said slidable members being fixedly angularly displaced so that said teeth of the one ring thereon are aligned with the spaces between said teeth of the other ring thereon, the width of spaces between said teeth of each of said four rings being approximately three times the width of said teeth and the ring of teeth on each one of said movable members being axially opposed to a respective associated fixed ring of teeth on said one element whereby each of said slidable members may be moved independently of the other into engagement with one of said fixed rings of teeth, means including a plurality of spring-loaded rods passing axially through holes in said slidable members whereby a force may be transmitted to at least one of said members to urge the teeth thereon into engagement with one of said rings of fixed teeth, means normally biasing said slidable members apart from each other, and means enabling said slidable members to be moved from a position of engagement to a position of disengagement with respect to said fixed rings of teeth.

2. A clutch mechanism as claimed in claim 1, wherein said two fixed rings of teeth are of the same radius and are provided in axially displaced planes on the inner periphery of a cylindrical portion secured to one of said rotatable elements, and said slidable members are mounted on axial splines on the other of said rotatable elements.

3. A clutch mechanism as claimed in claim 2, wherein said slidable members each comprise a plate mounted on said splines and a series of holes in each slidable member disposed in a circle around said splines, the holes in one member being in alignment with the holes in the other member and traversed by said spring-loaded rods.

4. A clutch mechanism as claimed in claim 3, wherein said other rotatable element includes a helical splined portion in addition to said axial splines, a threaded collar mounted on said helical splines, said collar having an axially directed face adjacent the ends of said spring-loaded rods, said collar supporting one element of a free wheel device whereof a second element engages said one rotatable element, said collar being free to move along said helical splines to impart a thrust to said spring-loaded rods when said rotatable elements are rotating and a positive differential speed arises above synchronism between said elements.

5. A clutch mechanism as claimed in claim 4, wherein said second free wheel element engages said one rotatable element by means including a friction clutch and means for disengaging said clutch to permit the said rotatable element to be reversed independently of said other rotatable element.

6. A clutch mechanism for connecting first and second coaxially mounted rotatable elements comprising in combination two rings of clutch teeth fixedly mounted on said first element, the teeth on said rings being in angular alignment with each other, said second element supporting a pair of clutch members slidably mounted thereon for axial movement only with respect to each other and to the said second element, each of said members having a ring of teeth angularly displaced with respect to the other so that said teeth of the one ring are aligned with spaces between said teeth of said other ring, an intermediate ring having an outer toothed periphery in mesh with the teeth of said first element and an inner periphery provided with teeth engageable by the teeth on said slidable clutch members, the teeth of all of said rings being spaced apart by a distance approximately three times the width of said teeth, said intermediate ring being supported on said first rotatable element by means adapted to provide a controlled torsional stiffness, means including a plurality of spring-loaded rods passing axially through holes in said slidable members whereby a force may be transmitted to at least one of said members to urge the teeth thereon into engagement with said intermediate toothed ring, means normally biasing said slidable members apart and means enabling said slidable members to be moved from a position of engagement with respect to said intermediate ring of teeth.

7. A clutch mechanism as claimed in claim 6, said intermediate ring being supported by a number of linkages including spring dashpots connected to said ring and said first rotatable element at circumferentially spaced intervals.

8. A clutch mechanism as claimed in claim 7, wherein said slidable members each comprise a plate mounted on axial splines on said second rotatable element and a series of holes in each slidable member disposed in a circle around said splines, the holes in one member being in alignment with the holes in the other member and traversed by said spring-loaded rods.

9. A clutch mechanism as claimed in claim 8, wherein said second rotatable element includes a helical splined portion in addition to said axial splines, a threaded collar mounted on said helical splines, said collar having an axially directed face adjacent the ends of said spring-loaded rods, said collar supporting one element of a free wheel device whereon a second element engages said one rotatable element, said collar being free to move along said helical splines to impart a thrust to said spring-loaded rods when said rotatable elements are rotating and a positive differential speed arises above synchronism between said elements.

10. A clutch mechanism as claimed in claim 1, wherein said two fixed rings of teeth are of different radius formed respectively on the inner and outer peripheral surfaces of a ring secured to said one rotatable element, the teeth on said fixed rings being in angular alignment on the same radii, and said slidable members are mounted on axial splines on said other rotatable element, one of said members having an externally toothed ring engageable with said inner peripheral surface, the other of said members having an internally toothed ring engageable with said outer peripheral surface.

11. In power transmitting apparatus, two coaxial rotating elements, two coaxial rings of clutch teeth fixed on one of said elements with the teeth of the two rings in angular alignment, two annular toothed clutch members longitudinally slidably mounted in axially spaced relation on the other of said elements with the teeth of each one of said members axially opposed to the teeth of a respective one of said fixed rings of teeth, the clutch teeth on one of said slidable members being angularly displaced in fixed relation to the clutch teeth on the other of said members and the width of the spaces between the teeth of each of said rings and members being approximately three times the width of said teeth so that the teeth of each of said members is capable of entering the spaces between the teeth of a respective one of said fixed rings independently of the other, means resiliently biasing said clutch members apart, and means for displacing both of said members from a disengagement position toward said fixed rings for engaging the teeth of each member with the teeth of a respective one of said fixed rings.

12. The apparatus defined in claim 11 wherein the teeth on one of said slidable members are angularly aligned with the spaces between the teeth on the other of said slidable members, and the teeth of at least one of said slidable members are angularly aligned with the spaces between the teeth of said fixed rings.

13. In the apparatus defined in claim 12, each tooth on one of said slidable members being angularly spaced with respect to the angularly nearest tooth on the other of said slidable members a distance that is equal approximately to the width of one tooth.

References Cited in the file of this patent

UNITED STATES PATENTS

| | | |
|---|---|---|
| 1,696,179 | Ahlm | Dec. 25, 1928 |
| 2,062,930 | Pritchard | Dec. 1, 1936 |
| 2,717,679 | Johnson | Sept. 13, 1955 |